US005545885A

United States Patent [19]
Jagielinski

[11] Patent Number: 5,545,885
[45] Date of Patent: Aug. 13, 1996

[54] METHOD AND APPARATUS FOR DETECTING AND IDENTIFYING CODED MAGNETIC PATTERNS ON GENUINE ARTICLES SUCH AS BANK NOTES

[75] Inventor: Tomasz Jagielinski, Carlsbad, Calif.

[73] Assignee: Eastman Kodak Company, Rochester, N.Y.

[21] Appl. No.: 577,760

[22] Filed: Dec. 22, 1995

Related U.S. Application Data

[63] Continuation of Ser. No. 891,006, Jun. 1, 1992, abandoned.

[51] Int. Cl.$^6$ .................................................. G06K 7/08
[52] U.S. Cl. ............................................ 235/449; 235/493
[58] Field of Search ................................. 235/449, 476, 235/493

[56] References Cited

U.S. PATENT DOCUMENTS

| | | | |
|---|---|---|---|
| 3,577,203 | 5/1971 | Beach | 235/449 |
| 4,058,706 | 11/1977 | Kao | 235/449 |
| 4,114,804 | 9/1978 | Jones et al. | 350/607 |
| 4,225,780 | 9/1980 | Jacoub | 235/449 |
| 4,593,184 | 6/1986 | Bryce et al. | 250/201.9 |
| 4,617,458 | 10/1986 | Bryce | 350/611 |
| 5,001,331 | 3/1991 | Leestemaker | 235/449 |
| 5,254,843 | 10/1993 | Hynes et al. | 235/449 |

*Primary Examiner*—Harold Pitts
*Attorney, Agent, or Firm*—William F. Noval

[57] ABSTRACT

Method and apparatus are used to detect and identify coded patterns on articles such as bank notes, in the form of magnetic regions (e.g., small areas printed with ink containing magnetic pigment). The apparatus includes a mechanism for passing a given article rapidly past a scanning location where a "write" magnetic head and its associated circuitry applies one or more recording signals (of a suitably high frequency) to these regions. The thus magnetized regions are then immediately sensed by a highly sensitive "read" head. The circuitry associated with the read head selectively amplifies the high frequency signals recorded on the magnetic regions. This further improves the signal-to-noise (S/N) ratio. It then compares the phases of the detected signals with a reference signal fed-forward from the write head circuitry. This further improves the accuracy of detecting the presence or absence of magnetized regions. After a sequence of regions in a coded pattern on a given article has been detected, the detected pattern and corresponding signal levels are compared in a "decision" circuit with the known pattern and signal levels of a genuine article (bank note).

3 Claims, 4 Drawing Sheets

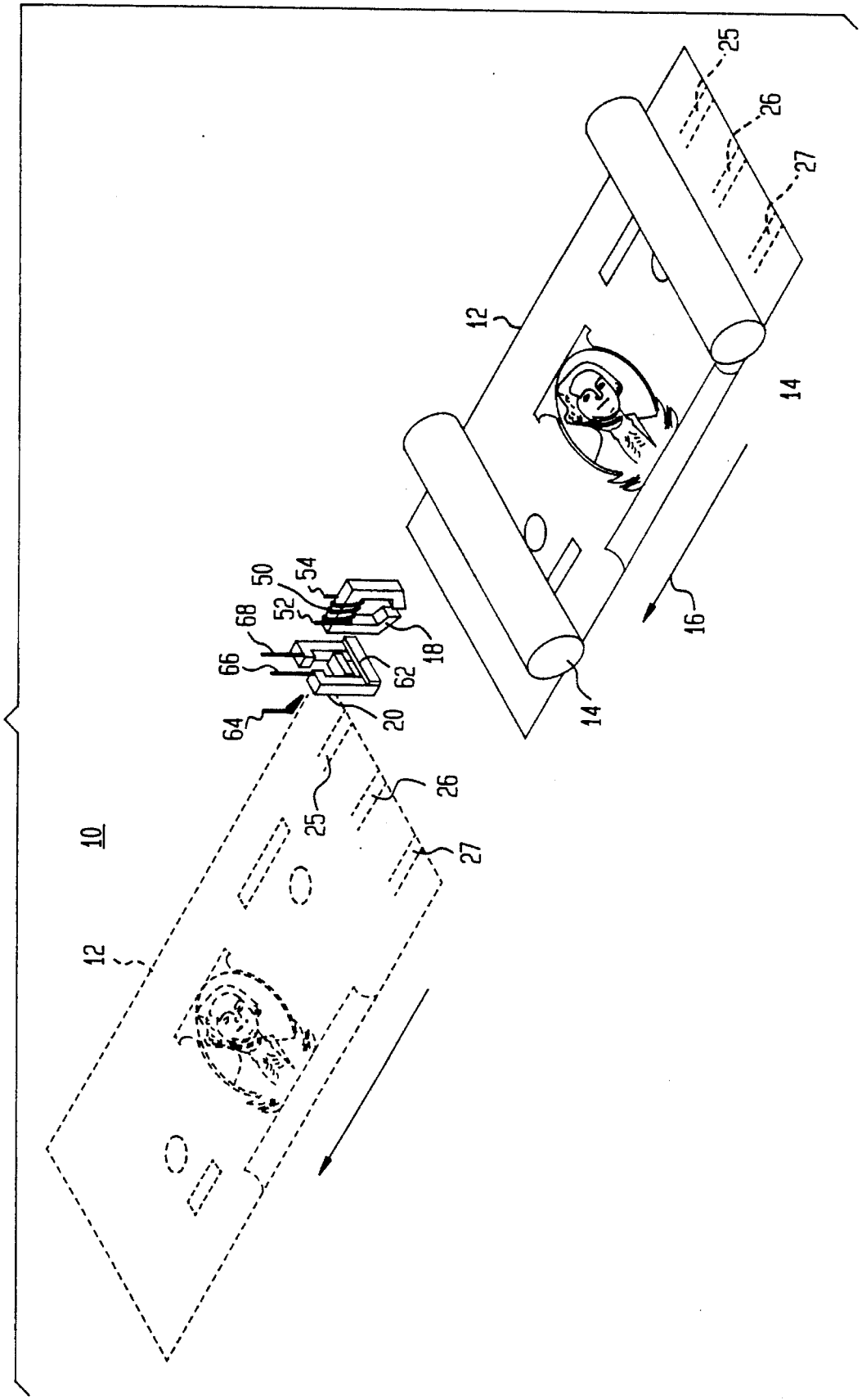

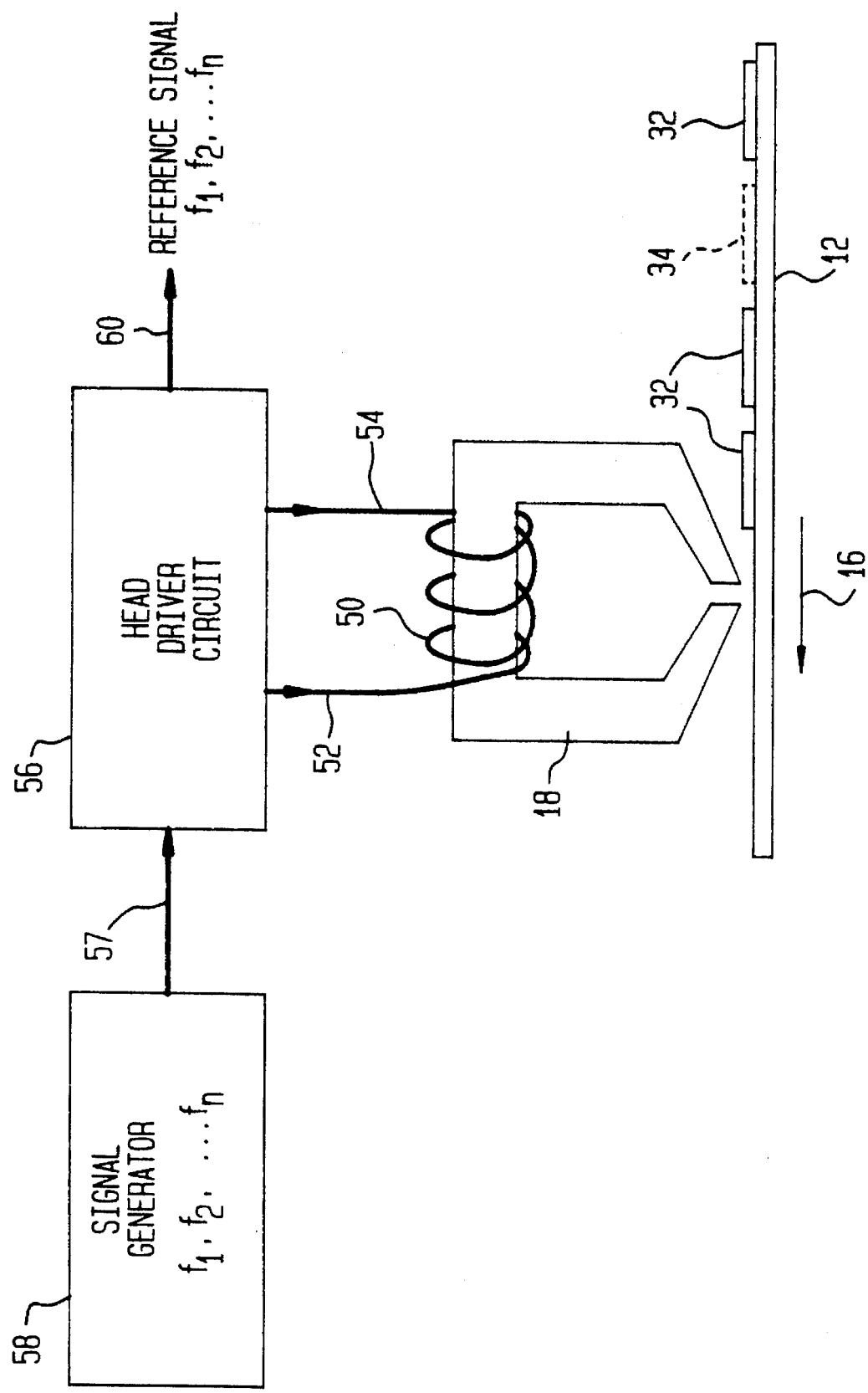

METHOD AND APPARATUS FOR DETECTING AND IDENTIFYING CODED MAGNETIC PATTERNS ON GENUINE ARTICLES SUCH AS BANK NOTES

This is a continuation of application Ser. No. 07/891,006, filed Jun. 1, 1992, now abandoned.

FIELD OF THE INVENTION

The present invention relates to a method and, apparatus including electronic circuit for the detection and identification of coded patterns in the form of magnetic ink regions (or small areas) printed on articles such as bank notes as a means of identifying genuine articles and of preventing the passing of forged or counterfeit ones.

BACKGROUND OF THE INVENTION

There is an on-going struggle between governments who issue genuine paper currency, and those criminals who attempt to make and pass off as genuine, worthless counterfeit imitations. In recent years, with the technological advances in printing by electronic imaging and high quality color copying processes, the task of the counterfeiter in making what appears to be genuine bank notes, has, in some respects, become much easier. Color copying machines are now available which are capable of electronically producing on virtually any kind of paper color prints of a finely detailed original image which appear visually perfect to an average person and which in fact are nearly indistinguishable on close comparison with an original. To prevent such machines from being used in the making of counterfeit currency, the United States and other governments have now begun to manufacture their paper money using various means to minimize the likelihood of counterfeiting. One of the more effective of these anti-counterfeiting measures is the printing on the bank notes of distinctive coded patterns of magnetic regions (for example, small "spots"). The various inks with which the government prints its bank notes are selectively loaded with magnetic pigment and so the identifying magnetic pattern which is printed appears visually the same as the remaining non-magnetic printing on the bank note. A unique magnetic pattern for each denomination of bank note thus serves to identify a given bank note as genuine or not and can tell its denomination. The pattern of the magnetic regions on a note is not apparent to the eye even on close inspection of a genuine bank note. As such the pattern cannot be "copied" with a copying machine. In order to recognize accurately the coded magnetic pattern printed on a bank note it is necessary to provide a detection circuit of sufficient sensitivity that it can correctly sense and properly respond to the extremely low magnetic fields provided by the printed magnetic regions of the pattern. Paper currency as its name implies is basically "paper" which is not an optimum magnetic recording medium with a backing such as tensilized polyester. Being "paper" a bank note is easily wrinkled and its printed surface degraded by numerous factors including wear and tear. Moreover, the magnetic pigments which are compatible with the printing inks used in the manufacture of paper currency are not by any means optimum for magnetic recording and reproducing. For example, the coercivity of the magnetic medium on a quality magnetic tape or computer disc may have a value of 800 Oersteds (Oe) whereas a magnetic region (spot) printed on a bank note has a coercivity of less than 100 Oe. Additionally, the remanent magnetization of a printed magnetic region on a bank note is less than one-tenth of the remanent magnetization on a quality magnetic tape. These factors plus the deteriorated physical condition of an "average" bank note after it has been in circulation for even a short time, make it extremely difficult to reliably detect and identify a pattern of magnetic regions printed on the bank note. It is therefore desirable to provide a method and an efficient electronic detection apparatus which can accurately, rapidly, and consistently detect the very low level of signals of the magnetic patterns of the printed regions on any and all bank notes (and similar articles) regardless of whether they are new, or old and worn.

SUMMARY OF THE INVENTION

In accordance with the present invention, in a preferred embodiment thereof, there is provided a method and an electronic apparatus and circuitry for scanning at high speed individual bank notes containing magnetic regions by magnetic "write" and "read" heads. As an individual note is scanned the magnetic regions printed on the note first have one or more selected high frequency magnetic signals recorded on them in the form of magnetic flux reversals by the write head. The frequency of the recorded signal is desirably such that the length of each flux reversal (recorded wavelength) along the length of the region is less than one-tenth the length of the region and preferably less than one-hundredth the length. Each such region, with its recorded pattern of magnetic flux reversals, then passes immediately underneath a highly sensitive "read" head which, as will be explained hereinafter, is advantageously a magnetoresitive (MR) read head. The signals from the read head are applied through a narrow-band, high-gain preamplifier and then to a phase sensitive amplifier. This phase sensitive amplifier, by comparing the phase of the signal from the MR read head with the phase of a reference signal from the write head and its associated circuitry, is able to accurately detect the presence or absence of extremely low levels of genuine signals even with background noise which may at times exceed the level of the genuine signals themselves. Thus the sensitivity and signal-to-noise (S/N) ratio of this electronic detection apparatus is vastly improved over the S/N ratios of prior detection circuits which have been previously used with paper currency. After the signals from the magnetic regions are detected, the coded pattern and the level of signal output is compared with a known pattern and the signal level of a genuine bank note to determine if they both match. If they do, the bank note is accepted as genuine. To further insure that the printed magnetic regions on a bank note will be detected with absolute accuracy even though the bank note is wrinkled, or has faded printing, or is otherwise degraded by wear and tear, one or more additional recorded frequencies may be impressed on the magnetic regions by the write head as the bank note is being scanned. Thus if the "read" circuitry fails to detect one frequency (for whatever reason) the circuit has the additional chance or chances to detect the other frequencies. This arrangement provides redundancy in the detection of the magnetic regions. The probability of detecting a recorded signal from each printed region in the presence of a high level of noise (or low level of signal) is thus further enhanced by providing a plurality of signals of different frequencies.

The present invention in one aspect is directed to an apparatus for detecting counterfeit bank notes and similar articles which may be forged. The apparatus comprises electronic circuitry and a magnetic recording head for applying a high frequency magnetic field to magnetic regions on the face of an article to produce short-length flux reversals within the magnetic regions; a magnetic pickup head for sensing the flux reversals on the magnetic regions; and electronic amplifying means connected to the pickup head for detecting and identifying as genuine a coded pattern of magnetic regions on the article, the amplifying means having a high gain preamplifier with a narrow signal band-pass centered on the high frequency signal of the recording head.

The present invention in another aspect is directed to a method for detecting counterfeit articles such as bank notes. This method comprises the steps of applying a high frequency magnetic field to magnetic regions on the face of the article to produce remanent short-length flux reversals or signals within the magnetic regions; magnetically sensing the flux reversals or signals recorded on the magnetic regions; accurately detecting the magnetic regions by amplifying within a frequency range the high frequency signals detected in the magnetic regions to improve the signal-to-noise ratio; and comparing the detected patterns of magnetic regions on the article with the known patterns on a genuine article.

A better understanding of the invention, together with its important advantages will best be gained from a study of the following description given in conjunction with the accompanying drawings and claims.

BRIEF DESCRIPTION OF THE DRAWINGS

FIG. 1 shows a schematic representation of portions of an electronic apparatus and circuitry in accordance with the present invention for detecting and identifying coded patterns of magnetic regions printed on an article such as a bank note;

FIG. 4 shows a schematic diagram of a further portion of the apparatus of FIG. 1 showing an electronic generator and drive circuit and a "write" head for recording signals with enhanced detectability on the printed magnetic regions of an article such as a bank note.

DETAILED DESCRIPTION

Figure 3:
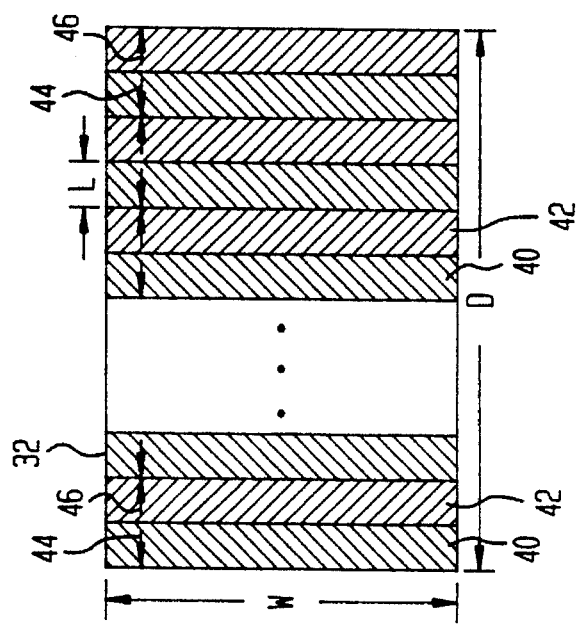
FIG. 3 shows a further enlarged view of a single magnetic region schematically showing a recorded magnetic signal in the form of magnetic flux-reversals within the region.

Referring now to FIG. 1, there are shown in schematic form portions of an electronic apparatus and circuit 10 for detecting and identifying coded patterns of magnetic regions (to be described shortly) printed on articles such as bank notes. Additional portions of the electronic circuitry will be described hereinafter in conjunction with FIGS. 4 and 5. As seen in FIG. 1, a paper bank note 12, from a stack of similar notes (not shown), is adapted to be driven by a plurality of rollers 14 (or other suitable means) in the direction of an arrow 16 past a station comprising a magnetic "write" head 18 and a magnetic "read" head 20. Each bank note 12 with its "image" side facing up passes under the write and read heads 18 and 20 at a suitable velocity. This velocity, by way of example, may be between 40 and 400 inches per second.

As each note 12 moves under and past the write head 18, a high frequency recording signal is applied to the magnetic regions which are printed in a coded pattern on the face of the bank note. The read head 20, being closely positioned adjacent the write head 18, is adapted to immediately detect the high frequency signals just "written" by the write head 18 onto the magnetic regions passing underneath it. This arrangement of heads and the electronic circuitry provided according to the invention, which will be described in detail hereinafter, greatly improves the signal-to-noise (S/N) ratio and hence accuracy in detecting the presence or absence of the magnetic regions. There may be several separate lengthwise tracks of printed magnetic regions as indicated by the three parallel pairs of dashed lines 25, 26, and 27. These respective tracks advantageously lie along the upper and lower printed serial numbers on the face of the bank note, and through the seal and picture images printed in the center part of the note. Each note is driven past the magnetic heads 18 and 20 to a position on the left indicated by the dashed outline of a note 12 where it and other notes are collected.

Figure 2:
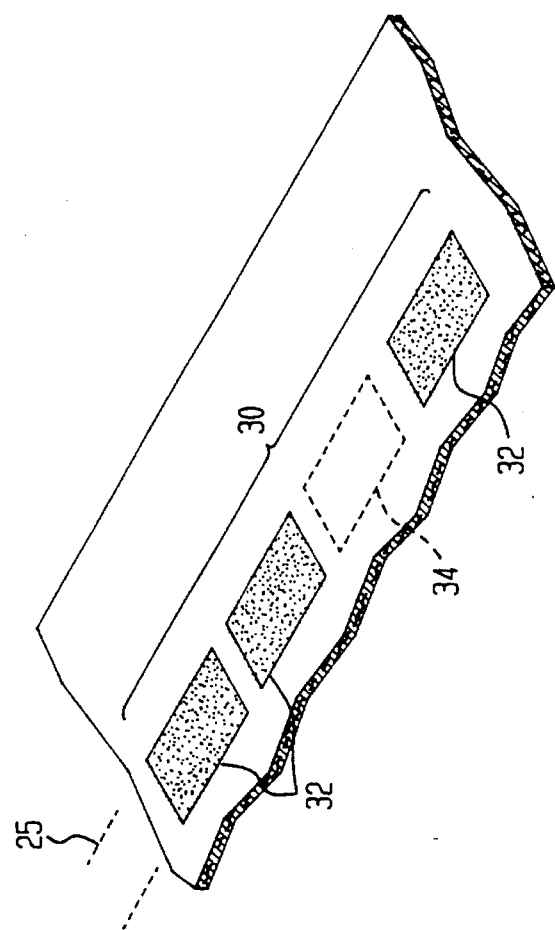
FIG. 2 shows a greatly enlarged portion of an article showing part of a pattern of magnetic regions printed on the article.

Referring now to FIG. 2, there is shown greatly enlarged in schematic form a small portion of a sequence 30 of magnetic regions 32 printed on the note 12 along the lengthwise track 25. Different sequences 30 (not shown) may be printed along the tracks 26 and 27. Each region 32 is a small area printed with ink containing magnetic pigment of a known quality. By way of example two closely spaced magnetic regions 32 are shown here (shaded areas), then a non-magnetic "blank" space 34 indicted by a dashed-line rectangle, and then another magnetic region 32, and so on, in a predetermined sequence of regions 32 and spaces 34. There may be more than one blank space 34 between two regions 32. Each space 34 may however have printing over it with ink not containing magnetic pigment and so the sequence 30 of printed magnetic regions 32 and non-magnetic spaces 34 will not be visually different to the human eye from the ordinary printing on the face of the bank note. The multiple tracks 25, 26 and 27 of different sequences 30 of magnetic regions 32 and spaces 34 thus provide a unique coded pattern respective to each denomination of bank note. The detection of a particular coded pattern and the "true" comparison of the pattern with that of a genuine bank note thus serves to identify genuine bank notes and to segregate out counterfeit ones.

Referring now to FIG. 3, there is shown further enlarged a single one of the printed magnetic regions 32. The width "W" of the region 32 is the width of one of the tracks 25, 26 and 27. This width W and the distance "D" that each region 32 extends along a track are conveniently chosen so that the regions 32 may be unobtrusively printed with magnetic ink along with other non-magnetic printing on the face of the bank note. As each region 32 passes under the write head 18 (see FIG. 1), the high frequency magnetic field generated by the head records a signal on each region 32. The remanent pattern of this signal is in the form of narrow magnetized areas, indicated by the shaded areas 40 and 42 with opposite magnetizations in the direction of the arrows 44 (pointing left in FIG. 3) or in the direction of the arrows 46 (pointing right). The areas 40 and 42 thus represent magnetic flux reversals which in turn induce multiple signals in the read head 20 as the region 32, with its multiple flux reversals, passes underneath the head. Advantageously each flux reversal within a region 32 has a length "L" which is less than one-tenth and preferably about one-hundredth, the length or distance D of the region. The presence of a large number of flux reversals in each magnetic region 32 greatly improves the ability of a detection circuit, also provided according to the invention, to accurately detect the presence or absence of a magnetic region 32, compared with merely detecting a single flux reversal at the beginning and end of a region 32. This improvement is important in accurately detecting the very low level signals provided by regions printed on paper with magnetic ink, as is the case here. Moreover, because the printed magnetic regions 32 may be faded by wear or the bank note is otherwise in poor condition, a signal from a region may be at such low level that the noise level in the detection circuit equals or possibly exceeds the signal level. The present invention substantially overcomes this problem.

Referring now to FIG. 4, there is shown the write head 18 (see also FIG. 1) and its associated electronic circuitry. The write head 18 has a conventional inductive drive coil 50 which is connected via a pair of leads 52 and 54 to a head driver circuit 56 of a type well known in the art. The circuit 56 in turn is driven via a lead 57 by a signal generator 58 with one or more frequencies f1, f2 to fn, as may be desired. As a magnetic region 32 on the bank note 12 passes at suitable velocity underneath the write head 18 in the direction of the arrow 16, a magnetic pattern is recorded on the region 32 (see FIG. 3). The lengths of the flux reversals 44 and 46 within a region 32 are determined by the signal applied to the head coil 50 (e.g., frequency f1). In the case of a magnetic region 32 having a length or distance D for example of 2 mm, it is desirable, as explained above, that the length L of a flux reversal be 0.2 mm or less. Thus for a bank note moving in the direction of the arrow 16 with a velocity of 400 inches per second, the frequency of the recorded signal (e.g. frequency f1) applied by the head 18, should be at least 100 KHz. If signals of frequencies f2 to fn are used in addition to a frequency f1, they should be suitably separated from each other so that they can be detected separately. Thus a frequency f2 may have a value a few percent higher than frequency f1 and so on, with suitable spacings to frequency fn. The head driver circuit 56 energizes the write head 18 at a sufficiently high level so that the magnetic field produced by the write head 18 saturates the magnetic particles in a region 32. However, if desired, an erase head (not shown) may be used in addition to the write head 18 to remove all previous signals recorded on the regions 32 before they pass underneath the write head 18. In addition to energizing the write head 18, the head driver circuit 56 provides via an output lead 60, a "phase" reference signal proportional to current and field phase for each of the frequencies f1, f2 through fn. This reference signal, as will be explained hereinafter, is applied to the detection circuitry associated with the read head 20 and helps to greatly improve the sensitivity and the accuracy of that circuitry in detecting the presence or absence of a magnetic region 32.

Figure 5:
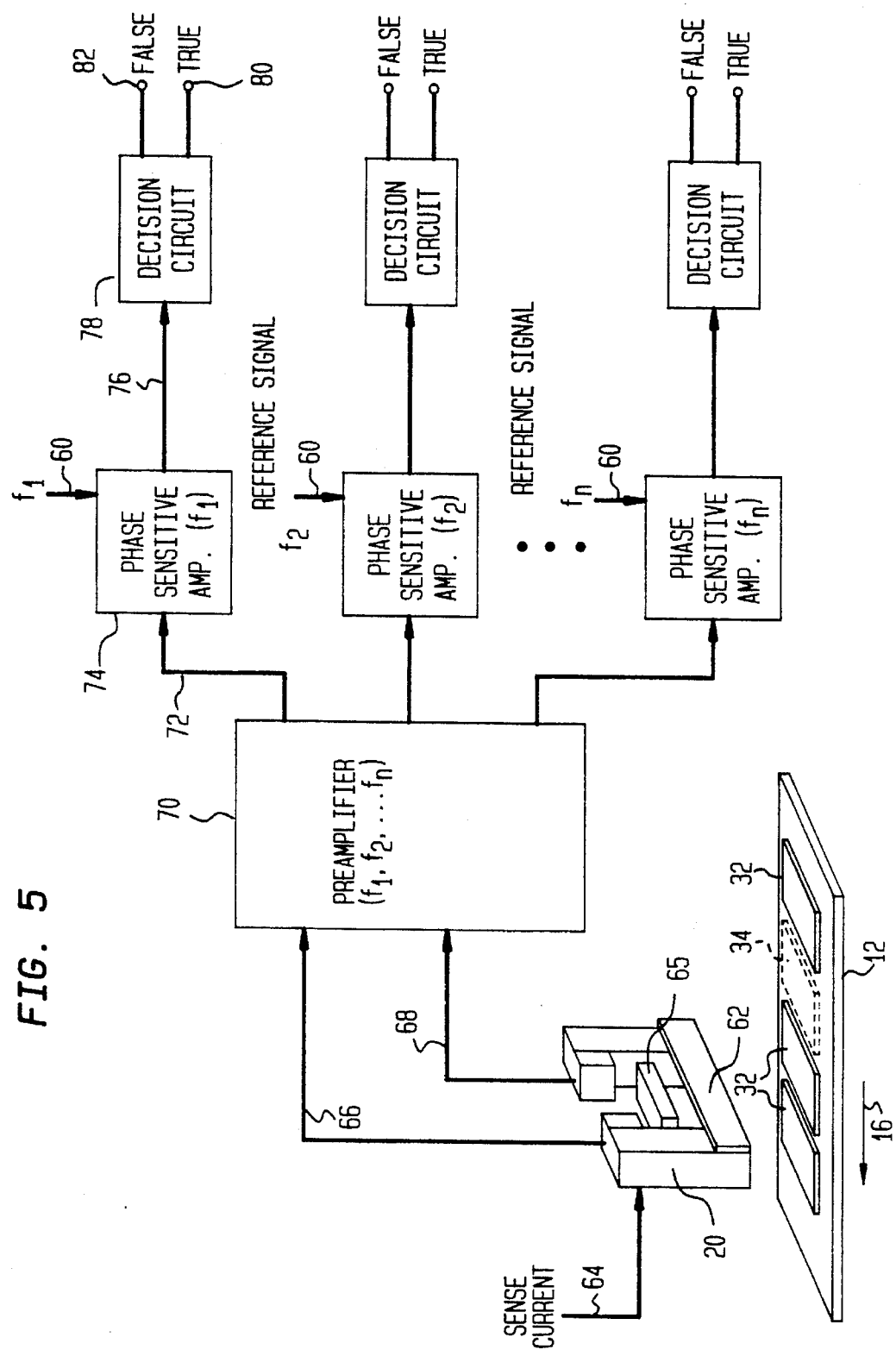
FIG. 5 shows a schematic diagram of a further portion of the apparatus of FIG. 1 showing an electronic detection circuit, including a magnetoresistive (MR) "read" head, for detecting and identifying the coded pattern of magnetic regions printed on articles such as bank notes.

Referring now to FIG. 5, the read head 20 is shown here in a preferred embodiment as a magnetoresistive (MR) head, of a type well known in the art. The head 20 has a magnetoresistive element 62 across which is generated signal voltages in accordance with the magnetic flux reversals being sensed by the head 20 as a bank note 12 passes underneath the MR read head 20. The flux reversals 44 and 46 recorded on a magnetic region 32, which have just previously been recorded by the write head 18 (not shown here) induce alternating voltages across the MR element 62 of the read head 20. These alternating signal voltages are generally of very low level because of the low coercivity of the printed magnetic regions, as was explained above. This level however is a function of the quality of the magnetic pigment used to print the magnetic regions 32. The signal level of a bank note being sensed can thus be compared to the signal level produced by a genuine bank note to help determine whether the bank note being sensed is genuine or not. The surface of the bank note may be wrinkled and hence the magnetic regions may pass beneath the head 20 at varying distances slightly closer or farther away from it. But because of its higher sensitivity and the fact that a MR head is sensitive to the magnitude of flux rather than to the rate of change of flux, the use of a MR head here as the read head 20 is preferable in this application compared to an inductive head. The MR head 20 here is provided with sense current via an input buss 64 to optimize its sensitivity. A small permanent magnet 65 serves as one means to provide bias for the head 20 and to minimize noise due to the Barkhausen effect, as is well known in the art.

The high frequency signals generated across the MR element 62 of the read head 20 by the magnetic regions 32 with their multitude of flux reversals, are applied via a pair of leads 66 and 68 to a pre-amplifier 70. Here, the one or more signals of frequencies f1, f2 through fn which were just recorded on a region 32 are separated into respective narrow frequency bands and amplified to a suitable level by the preamplifier 70. A detected and amplified signal of frequency f1 from the preamplifier 70 is applied via a lead 72 to a high gain phase sensitive amplifier 74 having a narrow bandwidth centered about frequency f1. A "phase" reference signal fed forward from the write head 18 via the lead 60 (see FIG. 4) is also applied to the phase sensitive amplifier 74 which simultaneously compares the instantaneous phase of the reference signal with that of the detected signal from preamplifier 70. This use of a reference signal greatly improves the ability of the phase sensitive amplifier 74 to accurately detect low level signals from a magnetized region 32 even in the presence of a relatively high noise level. The circuit and operation of a phase sensitive amplifier, like amplifier 74, is well known in the art and need not be described further.

A detected signal of frequency f1 from the phase sensitive amplifier 74 is applied via a lead 76 to a decision circuit 78. This circuit contains logic and memory elements, of a kind well known in the art, which convert the successive signals (of frequency f1) derived from the magnetic regions 32 into a binary sequence of "ones" and "zeroes" with the "ones", for example, representing magnetic regions 32 and the "zeroes" representing blank spaces 34 (absence of regions) along a track (e.g., the track 25 of FIG. 2) lengthwise of the bank note. This sequence of ones and zeroes is then compared within the decision circuit 78 with a "true" sequence stored in memory and which would be present on a genuine bank note. If the detected and stored sequences match, the decision circuit 78 applies to an output terminal 80 a positive signal indicating "true", that is, that the bank note just scanned by the magnetic heads 18 and 20 is genuine. In the event the detected and the stored sequences do not match, the decision circuit 78 applies to an output terminal 82 a signal indicating "false", that is, that the bank note is not genuine.

The decision circuit 78, in addition to detecting and comparing the pattern of magnetized regions 32, also measures the levels of the signals produced by the magnetic regions 32 as detected by the MR read head 20. The magnetic inks used with genuine bank notes will produce a distinctive signal level between a known high and a known low value which is not produced by inks using different magnetic pigments. By comparing the signal levels produced by the magnetic regions 32 with those of a genuine bank note, a further measure of the genuineness of a bank note 12 is obtained by the decision circuit 78.

As mentioned previously, if redundancy in the detection of the presence or absence of the magnetic regions 32 is desired, additional recording signals with frequencies f2 through fn may be used in conjunction with the write head 18 of FIG. 4. If so used these additional signals of frequencies f2 through fn are advantageously detected, amplified and compared by the additional circuit elements respective to signals of frequency f2 through fn as shown in FIG. 5. These additional elements are identical to the circuit elements, respective to signals of frequency f1, which have just been described.

Since multiple lengthwise tracks of magnetic regions 32, such as the tracks 25, 26 and 27 indicated in FIG. 1, can be printed on a bank note (or similar article), the tracks may be scanned in parallel by additional sets of write and read heads 18 and 20 (and their respective circuitry). Alternatively, the bank note may be scanned track by track by indexing the one set of write and read heads 18 and 20 as the bank note moves lengthwise several times beneath them.

It will now be appreciated that the present invention provides a very rapid, efficient and cost effective means of accurately detecting the regions printed in magnetic ink in complex patterns on articles such as paper currency. Once accurately detected, the pattern of regions is easily compared with the "true" patterns on genuine articles to determine whether a given article is genuine or counterfeit. The use of a high frequency (e.g., frequency f1) field for magnetizing the regions 32, instead of a steady-state or permanent magnet field, enhances the S/N ratio. This in conjunction with a "phase" reference signal fed forward from the "write" circuitry to the "read" circuitry greatly improves sensitivity and accuracy in detection of the printed magnetic regions 32.

It is to be understood that the embodiment of method and apparatus for detecting and identifying coded patterns printed as magnetic regions on articles such as bank notes described herein is illustrative of the general principles of the invention. Modifications may readily be devised by those skilled in the art without departing from the spirit and scope of the invention. For example, the invention is not limited to a particular frequency (such as 100 KHz) or to a particular size of article or magnetic region or to a given overall coded pattern.

What is claimed is:

1. Apparatus for identifying genuine articles comprising:

a magnetic write head;

a magnetoresistive read head located near said magnetic write head;

means for moving an article having magnetic regions printed in coded patterns on the face thereof with ink containing magnetic pigment past said read and write heads;

a drive circuit for energizing said write head with at least one pure tone high frequency recording signal for recording said at least one pure tone high frequency signal on said magnetic regions;

a detection circuit including a phase sensitive amplifier coupled to said magnetic read head for detecting the presence or absence of said pure tone high frequency signal in said magnetic regions and for producing a detection signal which is amplified by said phase sensitive amplifier; and phase circuit means coupled to said drive circuit and said detection circuit for producing a phase reference signal proportional to the current and field phase of said at least one pure tone high frequency recording signal and for controlling said phase sensitive amplifier with said phase reference signal by comparing the instantaneous phase of said reference signal with that of said detection signal to improve the detection of low level signals from said magnetic regions.

2. The apparatus of claim 1 wherein said drive circuit energizes said write head with a plurality of different pure tone high frequency recording signal for recording said plurality of different pure tone high frequency recording signals on said magnetic regions of said article, wherein said detection circuit detects said plurality of different pure tone high frequency signals in said magnetic regions and wherein said phase circuit means produces a plurality of respective phase reference signals proportional to the current and field phase of said plurality of different high frequency signals and controlling said phase sensitive amplifier with said phase reference signals.

3. The apparatus of claim 1 wherein said detection circuit includes decision circuit means for comparing a detected pattern of signals from the magnetic regions with a known pattern such that if the detected and known patterns match the article is accepted as genuine.

* * * * *